(12) United States Patent
Chiapuzzi

(10) Patent No.: US 8,459,091 B2
(45) Date of Patent: Jun. 11, 2013

(54) DEVICE WITH REPLACEABLE ELEMENTS FOR CALIBRATING SCREWERS

(75) Inventor: Angelo Chiapuzzi, Noviglio (IT)

(73) Assignee: Atlas Copco BLM S.R.L, Paderno Dugnano (Milano) (IT)

( * ) Notice: Subject to any disclaimer, the term of this patent is extended or adjusted under 35 U.S.C. 154(b) by 70 days.

(21) Appl. No.: 12/998,622

(22) PCT Filed: Nov. 9, 2009

(86) PCT No.: PCT/IB2009/007400
§ 371 (c)(1),
(2), (4) Date: Jun. 8, 2011

(87) PCT Pub. No.: WO2010/055386
PCT Pub. Date: May 20, 2010

(65) Prior Publication Data
US 2011/0239729 A1    Oct. 6, 2011

(30) Foreign Application Priority Data
Nov. 14, 2008  (IT) .............................. MI2008A2030

(51) Int. Cl.
*G01G 19/56*    (2006.01)
(52) U.S. Cl.
USPC .......................................................... 73/1.09
(58) Field of Classification Search
None
See application file for complete search history.

(56) References Cited

U.S. PATENT DOCUMENTS

| | | | | |
|---|---|---|---|---|
| 409,659 | A * | 8/1889 | Barth ............................ | 279/43.3 |
| 2,566,566 | A * | 9/1951 | Howes ...................... | 73/862.325 |
| 3,153,930 | A | 10/1964 | Jackson | |
| 3,281,170 | A * | 10/1966 | Kaplan .......................... | 403/373 |
| 3,457,780 | A | 7/1969 | Agostini | |
| 4,485,682 | A * | 12/1984 | Stroezel et al. .......... | 73/862.331 |
| 5,676,501 | A * | 10/1997 | Peetz et al. .................... | 408/204 |
| 6,908,264 | B1 * | 6/2005 | Gundy .......................... | 408/204 |
| 7,210,878 | B2 * | 5/2007 | Koslowski et al. ........... | 408/1 R |

FOREIGN PATENT DOCUMENTS

| | | |
|---|---|---|
| DE | 37 06 895 C1 | 3/1988 |
| DE | 199 01 449 A1 | 7/1999 |

OTHER PUBLICATIONS

PCT Search Report dated Jan. 25, 2010.

\* cited by examiner

*Primary Examiner* — Robert R Raevis
(74) *Attorney, Agent, or Firm* — Hedman & Costigan, P.C.; James V. Costigan

(57) ABSTRACT

A test device for screwers, comprises a transducer (11) having a head (28) with a seat (19) for receiving the coupling end (13) of an adapter or joint simulator (12, 12'). The coupling end (13) is made with a side wall (21, 21') polygonally-fashioned in order to be received in the seat (19), achieved in a complementary polygonal manner. The head (28) can be tightened as a clamp in order to releasably lock, in the seat (19), the coupling end (13) of the adapter or joint simulator.

6 Claims, 1 Drawing Sheet

DEVICE WITH REPLACEABLE ELEMENTS FOR CALIBRATING SCREWERS

The present finding refers to a device for calibrating screwers.

In the field, calibrating devices are known comprising a joint simulator that is coupled with a suitable measuring transducer and that is equipped with a suitable end for being coupled with the screwer to be tested.

The joint simulator (which can also be a simple coupling adapter) must be able to be removed and replaced easily so as to adapt the device to the various screwers and to the various types of test. For such a reason, in the field, couplings have been proposed formed by a seat, in general having a square section, in which a matching end of the simulator is inserted. Unfortunately, such a system has a coupling clearance which can interfere with the measurements of the device, especially in the case in which impact screwers are used, where the "bounces" due to the clearance can mistakenly be interpreted as true values by the measuring system, providing an average peak measurement, at the end, which does not correspond to the true torque value of the screwer.

In order to avoid this drawback, a threaded coupling has been proposed, with the joint simulator which is screwed into a threaded seat of the device, said seat in particular having a threading with two or more threads. An example of this is described in DE 19901449.

The clearances, which would be harmful for the measurements, are thus eliminated, and a correct and repeatable measurement is obtained. A drawback of the screw assembly lies however, in the threaded coupling having two or more threads. Indeed, the unscrewing torque is less than that with which the simulator has been screwed and, thus, in order to avoid the simulator being unscrewed during tests (since the inner screw of the simulator at each test must be unscrewed, after it has been screwed in the measurement cycle), it is necessary for the screwing torque of the simulator into its seat to be substantially greater than the test torque provided by the simulator.

The screwing of the simulator is carried out by using a fork-shaped working wrench, thanks to the presence of a suitable fashioned plug area. If there are high torque values, it is necessary to use inconvenient extensions or to use an uphand hammer with which to give closing hits on the fork-shaped wrench and contrarily, in an opposite direction if disassembling.

Even more serious is the fact that the simulator assembly and disassembly torque is much greater (even double) the capacity of the transducer on which the simulator is screwed. There is therefore the risk of permanently deforming and overloading the transducer during the assembly and disassembly of the simulator.

A further drawback occurs if it is necessary to apply test torques in an opposite direction to the direction to that of the assembly threading of the simulator (for example, in the case of left handed screwers with right handed body threading). In such a case the impact screwers can generate short-lasting impacts but having a high peak value, with the risk of the simulator body being unscrewed (unless special models are made, with opposite threading, which are very complicated to manage).

The general purpose of the present finding is to avoid the aforementioned drawbacks by providing a calibrating device which does not introduce uncertainty caused by clearances and bounces, and at the same time maintains a simple structure and in which it is simple and fast to remove the simulator from the transducer without however, transmitting excessive strain to the transducer during the assembly and the disassembly.

In view of such a purpose it has been thought to make, according to the finding, a test device for screwers, comprising a transducer having a head with a seat for receiving the coupling end of an adapter or joint simulator, the adapter or joint simulator having an opposite working end intended for coupling with a screwer to be tested, characterized in that the coupling end is made with side wall polygonally-fashioned in order to be received in the seat, achieved in a complementary polygonal manner, the head being made tightenable as clamp in order to releasably lock in the seat the coupling end of the adapter or joint simulator.

In order to clarify the explanation of the innovative principles of the present invention together with its advantages with respect to the prior art, hereafter, with the help of the attached drawings, we shall describe a possible embodiment given as an example applying such principles. In the drawings.

Figure 1:
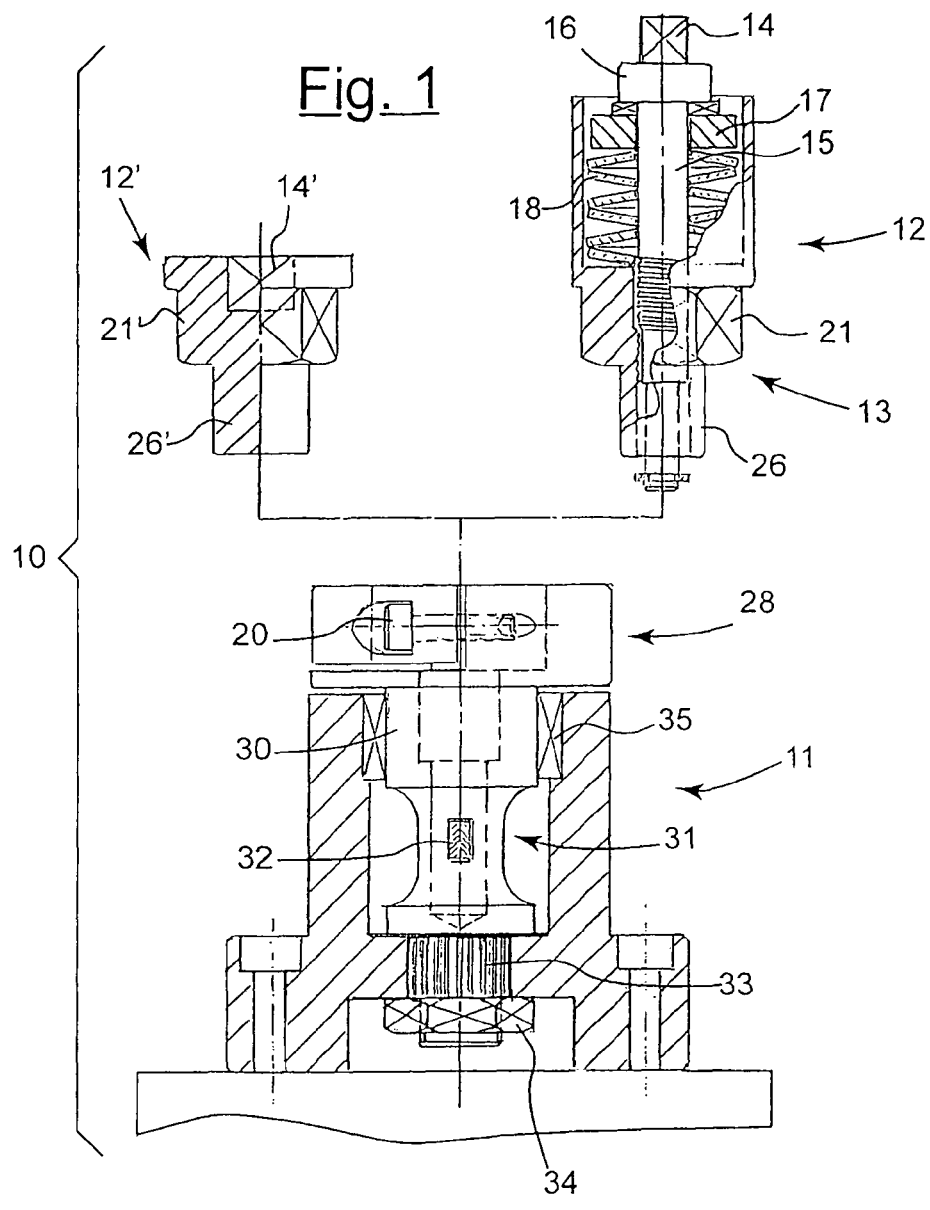
FIG. 1 represents a schematic view in section of a device according to the invention.

With reference to the figures, FIG. 1 shows a test device, wholly indicated with reference numeral 10, made according to the finding.

The device 10 comprises a test head which is formed by a transducer 11 to which a joint simulator 12 is connected.

The transducer is connected to a conventional detection and display electronic system, which can easily be imagined by a man skilled in the art and shall not therefore be shown or described hereafter.

The joint simulator comprises a coupling end 13 with a coupling head 28 of the transducer and an opposite working end 14 intended to be coupled with a screwer to be tested. The working end shall have a shape which is suitable for engagement with the various screwers, as is normal in the field. For example, it can be square-shaped.

The simulator can be made to function according to various known principles. It can also be made to provide a simple rigid coupling of its two ends, thus becoming a simple adaptor, in general having a female square drive, as shown with reference numeral 12'.

For the sake of simplicity hereafter we shall refer to both the yielding connection device 12 and the rigid connection device 12' as joint simulators.

The yielding simulator can advantageously comprise a shaft 15 integral with the working end 14 and with an opposite end which is screwed inside the body of the simulator compressing, through a bearing 16 and a plate 17, a series of cup springs 18, so as to simulate the increase of resisting torque up to a calibration value of the screwer.

Figure 2:
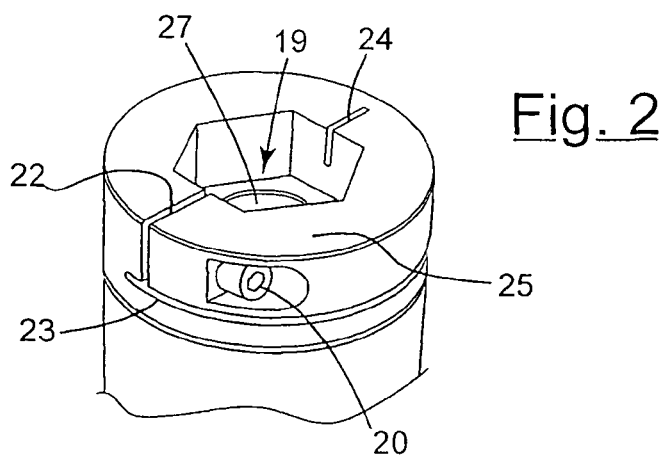
FIG. 2 represents a perspective view of a coupling end of the device of FIG. 1.

As can also be clearly seen in FIG. 2, the transducer 11 has a coupling head 28 made as a tightening element transverse with respect to the axis, with a polygonal seat (advantageously hexagonal). The tightening element is configured in a way such as to be able to act as a clamp, to releasably lock, through a tightening screw 20 arranged transversally, a matching polygonally-fashioned wall 21 (or 21') of the simulator or of the adaptor.

The tightening screw can have a head for coupling with a suitable working tool (for example, a standard hexagonal wrench) or it can be a screw with a built in working lever. The clamp type tightening is made possible by the fact that suitable notches 22, 23, 24 allow the elastic narrowing of the polygonal seat, forming a semicircular arm 25 on the side of the seat 19, said arm having a free end which is crossed by the screw 20 to tighten it towards the other half of the seat.

In such a way, the simulator is locked on the head of the transducer exerting a minimum torque on the tightening screw.

The simulator has a cylindrical part 26 (or 26') which axially projects from the polygonal part 21 (or 21') and that is inserted in an opposite seat 27 at the bottom of the polygonal seat 19 of the transducer so as to ensure the axis alignment. The polygonal coupling shall be suitably dimensioned according to the bulk dimensions of the simulator, in turn according to plate torque.

FIG. 1 also shows a possible advantageous embodiment of the transducer. According to such an embodiment, the clamp head 28 of the transducer is integral with, or rather, made as a single piece with a metal torsion shaft 30 which crosses a bearing 35 and has a suitably thin intermediate wall section 31 (depending on the maximum torque to be detected) with extensometer torque sensors 32. The torsion shaft 30 is made integral with the transducer body by means of a grooved coupling (spline) 33 made on the opposite side of the shaft with respect to the coupling head 28. A tightening nut 34 locks the end 33 of the shaft, eliminating possible coupling clearances.

It should be clear how the clamp head can be made by machining from a single piece of metal also comprising the torsion shaft.

At this point it should be clear how the aforementioned purposes have been achieved.

With a structure like that claimed hereby, clearances and bounces are avoided between the transducer and simulator, thus obtaining torque measurements which are reliable and which can be repeated. The replacement of the simulator occurs rapidly by opening the clamp of the transducer, without transmitting any unacceptable torque to the transducer itself.

Of course, the description above of an embodiment applying the innovative principles of the present finding is given as an example of such innovative principles and therefore should not be taken to limit the scope of protection claimed hereby. For example, the inner structure of the simulator and of the transducer can vary with respect to that shown.

The invention claimed is:

1. Test device for screwers, comprising a transducer (11) having a body and a head (28) with a seat (19) for receiving the coupling end (13) of an adapter or joint simulator (12, 12'), said adapter or joint simulator (12, 12') having at an end opposite to said coupling end (13) of said adapter or joint simulator (12, 12') a working end (14) intended for coupling with a screwer to be tested, characterized in that said coupling end (13) is made with side wall (21, 21') polygonally-fashioned in order to be received in said seat (19), which has a complementary polygonal shape to said coupling end (13) of the adaptor or joint simulator (12, 12'), said head (28) being adapted to be tightenable as a clamp in order to releasably lock, said coupling end (13) of the adapter or joint simulator in said seat (19) wherein said coupling end (13) has a cylindrical part (26 or 26') that axially projects from said adapter or joint simulator (12, 12') which is adapted to be inserted in a complementary seat (27) on the bottom of said seat (19) of the transducer (11) in order to align said transducer (11) and said adapter or joint simulator (12, 12').

2. Device according to claim 1, characterized in that said head (28) has clamp tightening notches (22, 23, 24) which allow the elastic narrowing of the polygonal seat (19) by tightening a transverse screw (20).

3. Device according to claim 2, characterized in that the said head (28) of said transducer is integral with a torsion shaft (30) which has an intermediate section (31) with extensometer torque, sensors (32) and an opposite end integral with the said transducer body.

4. Device according to claim 3, characterized in that said opposite end of said torsion shaft (30) has a grooved coupling (33) with a tightening nut (34) for eliminating coupling clearances.

5. Device according to claim 2, characterized in that the notches (22, 23, 24) form, on a side of said seat (19), is positioned a semicircular arm (25) with a free end which is crossed by said transverse screw (20) in order to tighten said semicircular arm (25) by tightening said transverse screw (20).

6. Device according to claim 1, characterized in that the simulator comprises a shaft (15), integral with said working end (14) of said adapter or joint simulator (12, 12') and with an opposite inner end of said shaft (15) which is screwed for compressing springs (18) in the simulator, in order to simulate, during the test, the increase of resisting torque.

\* \* \* \* \*